US012689604B2

(12) United States Patent
Seo et al.

(10) Patent No.: US 12,689,604 B2
(45) Date of Patent: Jul. 21, 2026

(54) METHOD, COMPUTER DEVICE, AND NON-TRANSITORY COMPUTER-READABLE STORAGE MEDIUM FOR KEEPING MESSAGES

(71) Applicant: LINE Plus Corporation, Seongnam-si (KR)

(72) Inventors: HyunJoo Seo, Seongnam-si (KR);
Sangbeom Kim, Seongnam-si (KR);
Hyo Jung Kim, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 104 days.

(21) Appl. No.: 18/916,966

(22) Filed: Oct. 16, 2024

(65) Prior Publication Data
US 2025/0133049 A1      Apr. 24, 2025

(30) Foreign Application Priority Data
Oct. 19, 2023    (KR) ........................ 10-2023-0140336

(51) Int. Cl.
*H04L 51/216*     (2022.01)
*G06F 3/04817*    (2022.01)
*G06F 3/04842*    (2022.01)

(52) U.S. Cl.
CPC ........ *H04L 51/216* (2022.05); *G06F 3/04817* (2013.01); *G06F 3/04842* (2013.01)

(58) Field of Classification Search
CPC ....... H04L 51/216; H04L 51/04; H04L 51/21; H04L 51/52; H04L 51/07; H04L 51/212; G06F 3/04817; G06F 3/04842; G06Q 50/50
See application file for complete search history.

(56) References Cited

U.S. PATENT DOCUMENTS

| | | | | |
|---|---|---|---|---|
| 8,843,041 B2 * | 9/2014 | Matsumoto | ........ | G03G 15/2053 |
| | | | | 399/327 |
| 10,819,532 B1 * | 10/2020 | van Rensburg | ......... | H04L 51/52 |
| 10,848,445 B1 * | 11/2020 | Willmann | ............. | H04L 51/046 |
| 11,121,993 B2 * | 9/2021 | Chilakamarri | ...... | H04L 67/1095 |
| 2010/0205539 A1 * | 8/2010 | Gestsson | ................. | H04L 51/04 |
| | | | | 715/752 |
| 2012/0023113 A1 * | 1/2012 | Ferren | ..................... | H04L 65/60 |
| | | | | 707/E17.084 |
| 2014/0280288 A1 * | 9/2014 | Hwang | ................ | G06Q 10/107 |
| | | | | 707/766 |

(Continued)

FOREIGN PATENT DOCUMENTS

KR      10-2002-0074304  A      9/2002

*Primary Examiner* — Vivek Srivastava
*Assistant Examiner* — Wuji Chen
(74) *Attorney, Agent, or Firm* — Sughrue Mion, PLLC

(57)                ABSTRACT

A message keeping method performed by at least one processor of a device includes receiving a selection input of at least one first message from among a plurality of messages included in a first chatroom, adding, based on the selection input, the at least one first message to a kept message list to be displayed in the first chatroom, and sending, to a second chatroom and based on the selection input, a second message associated with the at least one first message and including original content of the at least one first message and a link addressed to the first chatroom. The second chatroom is dedicated to message keeping.

20 Claims, 18 Drawing Sheets

(56)             References Cited

U.S. PATENT DOCUMENTS

| | | | |
|---|---|---|---|
| 2015/0169208 A1* | 6/2015 | Cho | G06Q 10/107 |
| | | | 715/752 |
| 2016/0344679 A1* | 11/2016 | Lane | H04L 51/214 |
| 2017/0346777 A1* | 11/2017 | Kim | H04L 51/04 |
| 2018/0167451 A1* | 6/2018 | Yi | H04L 65/1069 |
| 2018/0174265 A1* | 6/2018 | Liu | G06Q 30/0645 |
| 2018/0183619 A1* | 6/2018 | Jayaram | H04W 4/12 |
| 2020/0192661 A1* | 6/2020 | Doyle | G06F 8/73 |
| 2021/0004419 A1* | 1/2021 | Wang | G06F 40/169 |
| 2021/0320953 A1* | 10/2021 | Sexauer | H04L 65/1069 |
| 2022/0231982 A1* | 7/2022 | Hwang | H04L 51/52 |
| 2022/0360552 A1* | 11/2022 | Kim | H04L 51/216 |
| 2023/0064673 A1* | 3/2023 | Matsuoka | H04L 51/234 |
| 2023/0088720 A1* | 3/2023 | Wang | G06F 3/04817 |
| | | | 726/26 |
| 2023/0297211 A1* | 9/2023 | Kim | G06F 3/0482 |
| | | | 715/758 |
| 2023/0308406 A1* | 9/2023 | Kwon | H04L 51/046 |
| 2023/0370396 A1* | 11/2023 | Ban | H04L 51/18 |
| 2023/0370405 A1* | 11/2023 | Kim | H04L 51/226 |
| 2024/0388554 A1* | 11/2024 | Oh | H04L 51/04 |
| 2025/0133039 A1* | 4/2025 | Kwon | H04L 51/216 |
| 2025/0133049 A1* | 4/2025 | Seo | H04L 51/216 |
| 2025/0202857 A1* | 6/2025 | Hong | G06Q 10/10 |
| 2025/0330438 A1* | 10/2025 | Roh | G06F 16/345 |

* cited by examiner

FIG. 16

METHOD, COMPUTER DEVICE, AND NON-TRANSITORY COMPUTER-READABLE STORAGE MEDIUM FOR KEEPING MESSAGES

CROSS-REFERENCE TO RELATED APPLICATIONS

This application claims benefit of priority under 35 U.S.C. § 119 to Korean Patent Application No. 10-2023-0140336, filed Oct. 19, 2023, in the Korean Intellectual Property Office, the disclosure of which is incorporated by reference herein in its entirety.

BACKGROUND

1. Field

The present disclosure relates generally chatrooms, and more particularly, to methods, computer devices, and non-transitory computer-readable storage mediums for keeping messages of a chatroom.

2. Description of Related Art

An instant messenger may be a general communication tool that may refer to software that may allow a user to send and/or receive messages and/or data in real time, may allow the user to register a contact on a messenger, and/or may send and/or receive messages with a counterpart on a contact list in real time.

Such messenger functions may be commonly used in a mobile environment of a mobile communication terminal, as well as, a personal computer (PC).

For example, a mobile messenger service system and method of a portable terminal using a wireless communication network to provide a messenger service between mobile messengers installed on portable terminals is disclosed in Korean Patent Laid-Open Publication No. 10-2002-0074304, published on Sep. 30, 2002, the disclosure of which is incorporated by reference herein in its entirety.

The use of instant messenger applications and/or services may increase in popularity and/or the number and/or type of functions provided through the instant messenger applications and/or services may increase in diversity.

SUMMARY

One or more example embodiments of the present disclosure provide a message keeping function in the form of a personal chatroom that a user may access as a message keeping function.

Further, one or more example embodiments of the present disclosure provide for messages saved in a chatroom to be verified in the chatroom and a chatroom dedicated to memo keeping and manage the messages while maintaining linkage with chatroom originals.

According to an aspect of the present disclosure, a message keeping method performed by at least one processor of a device includes receiving a selection input of at least one first message from among a plurality of messages included in a first chatroom, adding, based on the selection input, the at least one first message to a kept message list to be displayed in the first chatroom, and sending, to a second chatroom and based on the selection input, a second message associated with the at least one first message and including original content of the at least one first message and a link addressed to the first chatroom. The second chatroom is dedicated to message keeping.

In some embodiments, the message keeping method may further include displaying, in the first chatroom and based on the selection input, at least one icon indicating that each message of the at least one first message is a kept message.

In some embodiments, the message keeping method may further include displaying an access icon in the first chatroom, and displaying, based on a first selection on the access icon, the kept message list in the first chatroom.

In some embodiments, the message keeping method may further include focusing the at least one first message in the first chatroom based on a second selection on the at least one first message in the kept message list.

In some embodiments, the message keeping method may further include displaying the second chatroom including the second message based on a request for entry into the second chatroom.

In some embodiments, the displaying of the second chatroom may include displaying time information, on a time at which the at least one first message is set as a kept message, based on the selection input, as message time information related to the second message.

In some embodiments, the displaying of the second chatroom may include displaying, as information associated with the at least one first message for the second message, at least one of sender information of the at least one first message or a name of the first chatroom.

In some embodiments, the message keeping method may further include moving from the second chatroom to the first chatroom based on a selection on the second message in the second chatroom, and transitioning focus to the at least one first message in the first chatroom.

In some embodiments, the message keeping method may further include displaying, in the second chatroom, a third message input through an interface of the second chatroom. The displaying of the third message may include distinguishably displaying, in the second chatroom, the second message and the third message.

In some embodiments, the distinguishably displaying of the second message and the third message may include distinguishing the second message from the third message by displaying information related to the at least one first message.

In some embodiments, the displaying of the second chatroom may include distinguishably displaying messages included in the second chatroom by content type.

In some embodiments, the displaying of the second chatroom may include filtering the second message among messages included in the second chatroom based on the first chatroom.

In some embodiments, the message keeping method may further include setting a reminder for the at least one first message based on at least one of a first selection on the at least one first message in the first chatroom or a second selection on the second message in the second chatroom.

In some embodiments, the message keeping method may further include displaying, based on the setting of the reminder for the at least one first message, a first reminder icon in the first chatroom indicating the setting of the reminder for the at least one first message and a second reminder icon in the second chatroom indicating the setting of the reminder for the second message.

In some embodiments, the message keeping method may further include providing a reminder notification for the at least one first message through the second chatroom.

In some embodiments, the message keeping method may further include moving, based on a third selection on the reminder notification, from the second chatroom to the first chatroom, and transitioning focus to the at least one first message in the first chatroom.

According to an aspect of the present disclosure, a non-transitory computer-readable storage medium storing instructions for message keeping that, when executed by at least one processor of a device, cause the device to receive a selection input of at least one first message from among a plurality of messages included in a first chatroom, add, based on the selection input, the at least one first message to a kept message list to be displayed in the first chatroom, and send, to a second chatroom and based on the selection input, a second message associated with the at least one first message and including original content of the at least one first message and a link addressed to the first chatroom. The second chatroom is dedicated to message keeping.

According to an aspect of the present disclosure, a device includes a memory storing computer-readable instructions, and at least one processor communicatively coupled to the memory. The at least one processor is configured to execute the computer-readable instructions to receive a selection input of at least one first message from among a plurality of messages included in a first chatroom, add, based on the selection input, the at least one first message to a kept message list to be displayed in the first chatroom, and send, to a second chatroom and based on the selection input, a second message associated with the at least one first message and including original content of the at least one first message and a link addressed to the first chatroom, the second chatroom being dedicated to message keeping.

In some embodiments, the at least one processor may be further configured to execute the computer-readable instructions to display the second chatroom including the second message based on a request for entry into the second chatroom, display, in the second chatroom, a third message input through an interface of the second chatroom, and distinguishably display, in the second chatroom, the second message and the third message.

In some embodiments, the at least one processor may be further configured to execute the computer-readable instructions to set a reminder for the at least one first message based on at least one of a first selection on the at least one first message in the first chatroom or a second selection on the second message in the second chatroom, and provide a reminder notification for the at least one first message through the second chatroom.

Additional aspects may be set forth in part in the description which follows and, in part, may be apparent from the description, and/or may be learned by practice of the presented embodiments.

BRIEF DESCRIPTION OF DRAWINGS

The above and/or other aspects, features, and advantages of certain embodiments of the present disclosure may be more apparent from the following description taken in conjunction with the accompanying drawings, in which:

FIGS. 15 to 18 illustrate examples of a kept message reminding process, according to at least one example embodiment.

DETAILED DESCRIPTION

Figure 1:
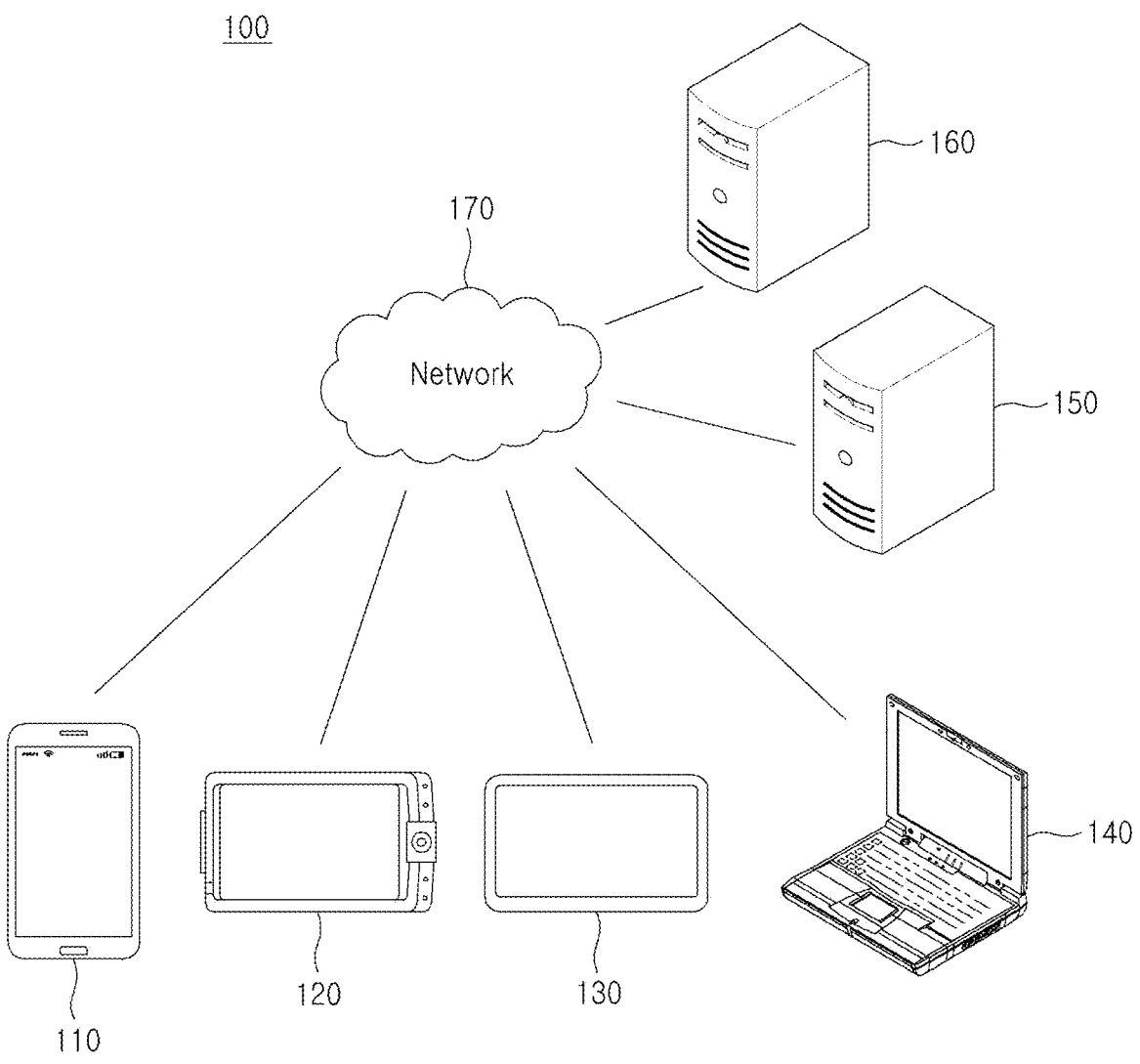
FIG. 1 is a diagram illustrating an example of a network environment, according to at least one example embodiment.

Example embodiments are described below with reference to the accompanying drawings.

In the following description, like drawing reference numerals may be used for like elements, even in different drawings. The matters described in the present disclosure, such as, but not limited to, detailed construction and elements, may be provided to assist in a comprehensive understanding of the example embodiments. However, it is to be apparent that the example embodiments may be practiced without those specifically defined matters. Also, well-known functions or constructions may not described in detail to avoid obscuring the description with unnecessary detail.

One or more example embodiments are described in detail with reference to the accompanying drawings. Example embodiments, however, may be embodied in various different forms, and should not be construed as being limited to only the illustrated embodiments. Rather, the illustrated embodiments are provided as examples so that the present disclosure may be thorough and complete, and may fully convey the concepts of the present disclosure to those skilled in the art. Accordingly, known processes, elements, and techniques, may not be described with respect to some example embodiments. Unless otherwise noted, like reference characters denote like elements throughout the attached drawings and written description, and thus descriptions may not be repeated.

Although the terms "first," "second," "third," or the like, may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of the present disclosure.

Spatially relative terms, such as "beneath," "below," "lower," "under," "above," "upper," and the like, may be used herein for ease of description to describe one element or feature's relationship to other elements and/or features as illustrated in the figures. It is to be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (e.g., rotated 90 degrees or at other orientations) and the spatially relative descriptors used herein may be translated accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It is to be further understood that the terms "comprises" and/or "comprising," when used in the present disclosure, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein may have the same meaning as commonly understood by one of ordinary skill in the art to which example embodiments belong. Terms, such as those defined in commonly used dictionaries, may be translated as having a meaning that is consistent with their meaning in the context of the relevant art and/or the present disclosure, and may not be translated in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, or the like) that may be implemented in conjunction with units and/or devices discussed in more detail below. Although discussed in a particular manner, a function or operation specified in a specific block may be performed differently from the flow specified in a flowchart, flow diagram, or the like. For example, functions or operations illustrated as being performed serially in two consecutive blocks may actually be performed concurrently, or in some cases may be performed in reverse order.

Units and/or devices according to one or more example embodiments may be implemented using hardware and/or a combination of hardware and software. For example, hardware devices may be implemented using processing circuitry such as, but not limited to, a processor, central processing unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, a central processing unit (CPU), a controller, an arithmetic logic unit (ALU), a digital signal processor, a microcomputer, a microprocessor, or the like), the computer processing device may be configured to carry out program code by performing arithmetic, logical, and input/output operations, according to the program code. Once the program code is loaded into a computer processing device, the computer processing device may be programmed to perform the program code, thereby transforming the computer processing device into a special purpose computer processing device. In particular, when the program code is loaded into a processor, the processor may become programmed to perform the program code and operations corresponding thereto, thereby transforming the processor into a special purpose processor.

Software and/or data may be embodied permanently and/or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion. In particular, for example, software and data may be stored by one or more computer readable record mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record medium may include a Universal Serial Bus (USB) flash drive, a memory stick, a Blu-ray drive, a digital versatile disc (DVD), a compact disc-ROM (CD-ROM) drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable record medium. Additionally, the computer programs, program code, instructions, or some combination thereof, may be loaded into the one or more storage devices and/or the one or more processors from a remote computing system that is configured to forward and/or distribute the computer programs, program code, instructions, or some combination thereof, over a network. The remote computing system may forward and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art may appreciate that a hardware device may include multiple processing elements and multiple types of processing elements. For example, a hardware device may include multiple processors or a processor and a controller. In addition, other processing configurations are possible, such as parallel processors.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein may be described and illustrated in terms of blocks, as shown in the drawings, which carry out a described function or functions. These blocks, which may be referred to herein as units or modules or the like, or by names such as device, logic, circuit, controller, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like.

In the present disclosure, the articles "a" and "an" are intended to include one or more items, and may be used interchangeably with "one or more." Where only one item is intended, the term "one" or similar language is used. For example, the term "a processor" may refer to either a single processor or multiple processors. When a processor is described as carrying out an operation and the processor is referred to perform an additional operation, the multiple operations may be executed by either a single processor or any one or a combination of multiple processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments are described with reference to the accompanying drawings.

The example embodiments relate to technology for keeping messages of a chatroom.

The example embodiments including the disclosures set forth herein may allow a message saved by a user among messages exchanged in a chatroom to be managed in the chatroom and also be managed in one place through a chatroom dedicated to memo keeping and may provide a link to the original.

A message keeping apparatus according to some example embodiments may be implemented by at least one computer device and a message keeping method according to some example embodiments may be performed by at least one computer device included in the message keeping apparatus. Here, a computer program according to an example embodiment may be installed and executed on the computer device and the computer device may perform the message keeping method according to example embodiments under control of the executed computer program. The aforementioned computer program may be stored in a computer-readable recording medium to computer-implement the message keeping method in conjunction with the computer device.

FIG. 1 illustrates an example of a network environment according to at least one example embodiment. Referring to FIG. 1, the network environment 100 may include a plurality of electronic devices (e.g., a first electronic device 110, a second electronic device 120, a third electronic device 130, and a fourth electronic device 140), a plurality of servers (e.g., a first server 150 and a second server 160), and a network 170. FIG. 1 is provided as an example only. Consequently, the number of electronic devices or the number of servers is not limited thereto. Also, the network environment of FIG. 1 is provided as one example of environments applicable to the example embodiments and an environment applicable to the example embodiments is not limited to the network environment of FIG. 1.

Each of the plurality of electronic devices 110 to 140 may be and/or may include a fixed terminal and/or a mobile terminal that may be configured as a computer device. For example, the plurality of electronic devices 110 to 140 may be and/or may include a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer devices capable of communicating with other electronic devices (e.g., second to fourth electronic devices 120 to 140), and/or the first and second servers 150 and 160 over the network 170 in a wireless and/or wired communication manner. The communication scheme is not limited and may include a near field wireless communication scheme between devices as well as a communication scheme using a communication network (e.g., a mobile communication network, wired Internet, wireless Internet, and a broadcasting network) includable in the network 170. For example, the network 170 may include at least one of network topologies that include, but not be limited to, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, these network topologies are provided as examples only, and as such, the present disclosure is not limited in this regard.

Each of the first and second servers 150 and 160 may be configured as a computer device and/or a plurality of computer devices that may provide an instruction, a code, a file, content, a service, or the like, through communication with the plurality of electronic devices 110 to 140 over the network 170. For example, the first server 150 may be and/or may include a system that may provide a service (e.g., a messenger service) to the plurality of electronic devices 110 to 140 connected over the network 170.

Figure 2:
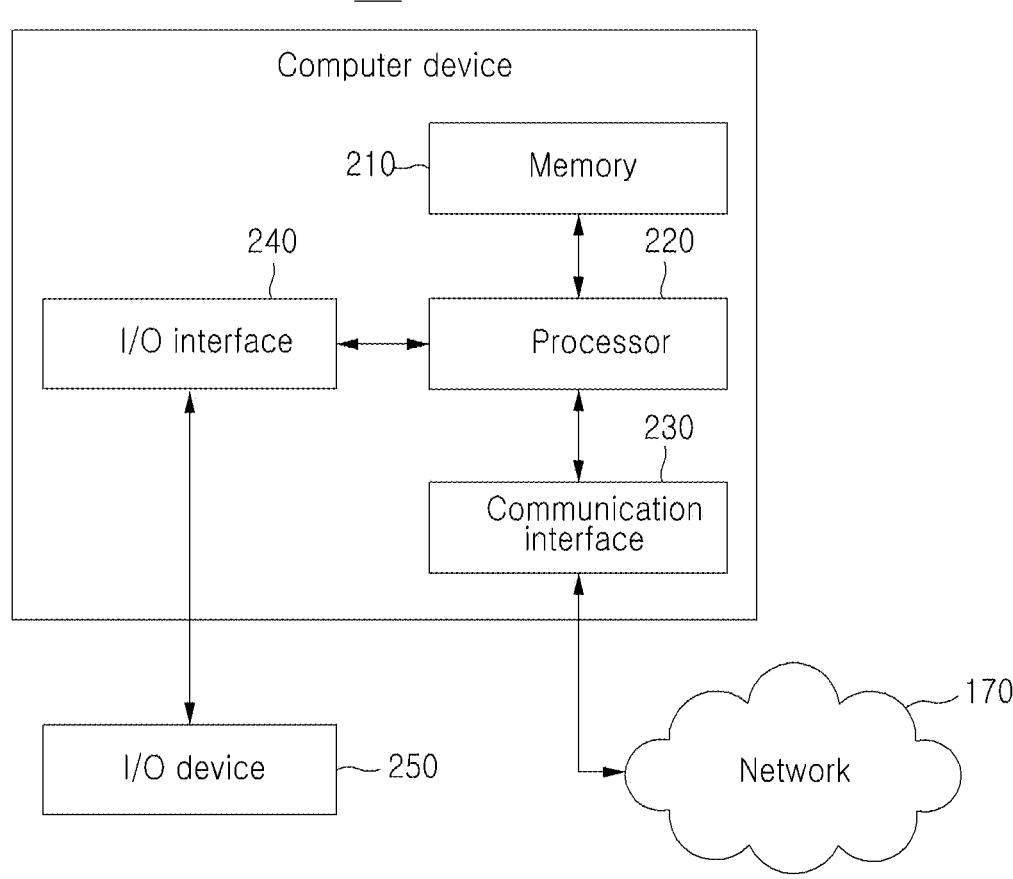
FIG. 2 is a diagram illustrating a configuration of a computer device, according to at least one example embodiment.

FIG. 2 is a block diagram illustrating an example of a computer device according to at least one example embodiment. Each of the plurality of electronic devices 110 to 140 and/or each of the first and second servers 150 and 160 may be implemented by a computer device 200 of FIG. 2.

Referring to FIG. 2, the computer device 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable recording (or storage) medium. The permanent mass storage device, such as ROM and/or a disk drive, may be included in the computer device 200 as a permanent storage device separate from the memory 210. Also, an OS and at least one program code may be stored in the memory 210. Such software components may be loaded to the memory 210 from another non-transitory computer-readable recording medium separate from the memory 210. The other non-transitory computer-readable recording medium may include, but not be limited to, a non-transitory computer-readable recording medium, for example, a floppy drive, a disk, a tape, a DVD/CD-ROM drive, a memory card, or the like. Alternatively or additionally, software components may be loaded to the memory 210 through the communication interface 230. For example, the software components may be loaded to the memory 210 of the computer device 200 based on a computer program installed by files received over the network 170.

The processor 220 may be configured to process instructions of a computer program by performing basic arithmetic operations, logic operations, and I/O operations. The computer-readable instructions may be provided by the memory 210 or the communication interface 230 to the processor 220. For example, the processor 220 may be configured to execute received instructions in response to a program code stored in a storage device, such as the memory 210.

The communication interface 230 may provide a function for communication between the computer device 200 and another apparatus, for example, the aforementioned storage devices, through the network 170. For example, the processor 220 of the computer device 200 may deliver a request and/or an instruction created based on a program code stored in the storage device such as the memory 210, data, or a file, to other apparatuses over the network 170 under control of the communication interface 230. Alternatively or additionally, a signal, an instruction, data, a file, or the like, from another apparatus may be received at the computer device 200 through the communication interface 230 of the computer device 200 over the network 170. For example, a signal, an instruction, data, or the like, received through the communication interface 230 may be delivered to the processor 220 or the memory 210, and a file, or the like, may be stored in a storage medium (e.g., a permanent storage device) further includable in the computer device 200.

The I/O interface 240 may be and/or may include a device used for interfacing with an I/O device 250. For example, the I/O device 250 may include an input device, such as, but not limited to, a microphone, a keyboard, a mouse, or the like, and/or an output device such as, but not limited to, a display, a speaker, or the like. As another example, the I/O interface 240 may be and/or may include a device for interfacing with a device in which an input function and an output function are integrated into a single function, such as, but not limited to, a touchscreen. The I/O device 250 may be configured as a single device with the computer device 200.

According to example embodiments, the computer device 200 may include a greater or a smaller number of components than the number of components illustrated in FIG. 2. For example, the computer device 200 may include other conventional components which may have been omitted for the sake of brevity. As another example, the computer device 200 may be configured to include at least a portion of the I/O device 250 and/or may further include other components, such as, but not limited to, a transceiver, a database, or the like. Hereinafter, example embodiments of a method and apparatus for keeping messages are described.

Although the following example embodiments are described using an instant (e.g., real-time) messenger as a representative example, any service platforms that provide a social network service such as various types of communities, as well as various types of services using resources such as user profile information and friend relations within the social network service may be applied in addition to the messenger.

In the present disclosure, a message may include any data type of content that may be delivered through a messenger, such as, but not limited to, a photo, a video, a link, a text, a file, a location, or the like.

The example embodiments provide a message keeping function that provides for a user to save a message as a memo in a chatroom within the messenger, and manage the message saved by the user in conjunction with the original message through a chatroom dedicated to memo keeping.

The computer device 200, according to the example embodiment, may provide a client with a messenger service through a connection to a dedicated application installed on a client server and/or a website/mobile site related to the computer device 200. A computer-implemented message keeping apparatus may be configured in the computer device 200. For example, the message keeping apparatus may be implemented in an independently operating program form or may be configured in an in-app form of an application to be operable on the application.

The processor 220 of the computer device 200 may be implemented as a component for performing the following message keeping method. According to example embodiments, the components of the processor 220 may be selectively included in and/or excluded from the processor 220. Alternatively or additionally, the components of the processor 220 may be separated and/or merged for functional representations of the processor 220.

The processor 220 and the components of the processor 220 may control the computer device 200 to perform operations included in the following message keeping method. For example, the processor 220 and the components of the processor 220 may be implemented to execute an instruction according to a code of at least one program and a code of an OS included in the memory 210.

As used herein, the components of the processor 220 may be and/or may include representations of different functions performed by the processor 220 according to an instruction provided from a program code stored in the computer device 200.

The processor 220 may read a necessary instruction from the memory 210 to which instructions related to control of the computer device 200 are loaded. In such a case, the read instruction may include an instruction for controlling the processor 220 to perform the following operations.

Operations included in the following message keeping method may be performed in an order different from the illustrated order. Alternatively or additionally, some operations may be omitted, or an additional process may be further included.

Operations included in the message keeping method may be performed by a client and, depending on example embodiments, at least some of the operations may also be performed by the first or second server 150 or 160.

Figure 3:
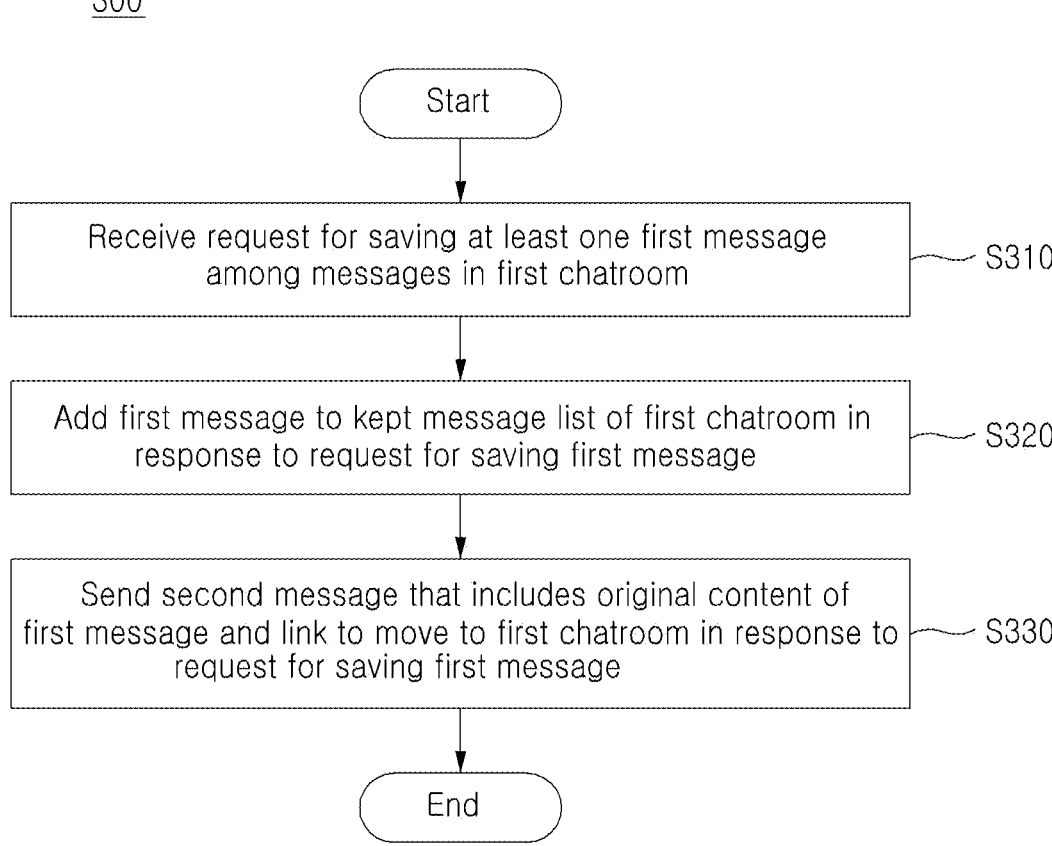
FIG. 3 is a flowchart illustrating an example of a method performed by a computer device, according to at least one example embodiment.

FIG. 3 is a flowchart illustrating an example of a method 300 performed by a computer device according to at least one example embodiment.

Referring to FIG. 3, in operation S310, the processor 220 may receive a request for saving at least one message (hereinafter referred to as a first message) from among messages that may be exchanged through a first chatroom, which is one of the chatrooms (e.g., a one-on-one chatroom, a group chatroom, an open-chat chatroom, or the like) generated in a messenger. A user may select at least one first message that the user desires to keep from among the messages in the first chatroom as a request for designating the first message as a message to be kept. That is, the user may request to save and/or share the first message as a memo as part of a message keeping function of the messenger application.

In operation S320, in response to a request for saving the first message, the processor 220 may add the first message to a kept message list of an original chatroom corresponding to a source of the corresponding message (e.g., the first chatroom). The processor 220 may provide a user interface for managing and/or viewing the kept message list of each chatroom and may automatically add a message saved and/or shared by the user as a memo in the first chatroom to the kept message list of the first chatroom. That is, the method 300 may provide for the managing of a message saved and/or shared by the user from among messages exchanged in a chatroom for each chatroom of a messenger, as a kept message list that may be verified within the corresponding chatroom.

In operation S330, the processor 220 may send a second message that includes original content of the first message and a link to move to the first chatroom corresponding to the source of the first message to a second chatroom (hereinafter referred to as a chatroom dedicated to memo keeping) as a message associated with the first message in response to the request for saving the first message. For example, the link may be addressed to the first chatroom. To integrally manage kept messages of each chatroom in one place regardless of chatroom, the processor 220 may keep all messages saved or shared as kept memos in each chatroom by sending the messages to the chatroom dedicated to memo keeping (e.g., the second chatroom). The example embodiment may manage kept messages in all chatrooms in one place through the chatroom dedicated to memo keeping regardless of chatroom and, furthermore, may manage each of the kept messages in association with an original message and a chatroom that is a message source through the chatroom dedicated to memo keeping, which may lead to strengthening the link with the original.

Figure 4:
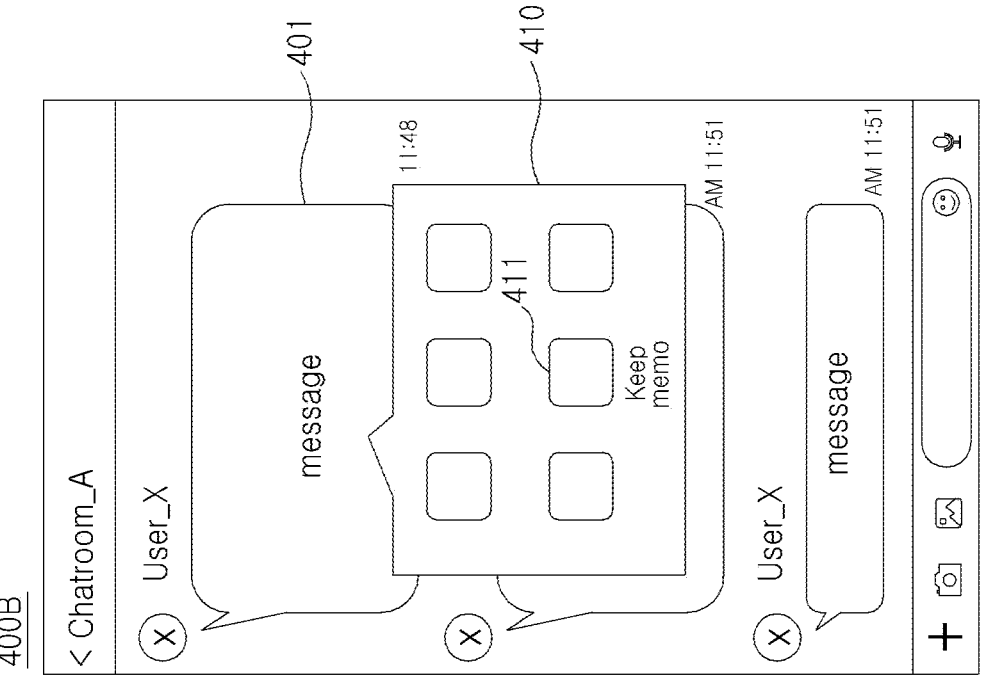
FIGS. 4 and 5 illustrate examples of a kept message setting process, according to at least one example embodiment.
Figure 5:
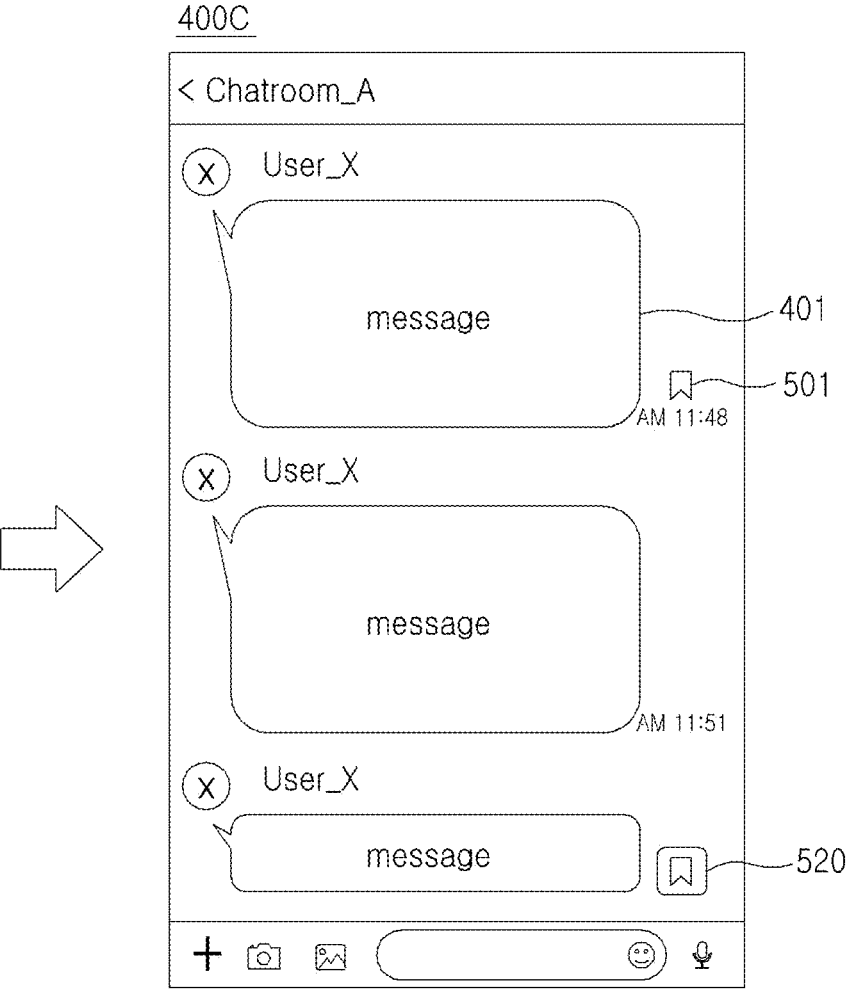

FIGS. 4 and 5 illustrate examples of a kept message setting process, according to at least one example embodiment.

The processor 220 may provide a message keeping function capable of bookmarking a specified speech balloon in a chatroom.

Referring to FIG. 4, in response to a selection on a first message 401 that is one of the messages included in a first chatroom Chatroom_A in a user interface (UI) 400A, a context menu screen 410 may be activated, as shown in UI 400B. For example, the context menu screen 410 may include a Keep memo menu 411 for setting a message to be kept. By keeping the first message 401 as a kept memo using the Keep memo menu 411 in the first chatroom Chatroom_A, the first message 401 may be set as a kept message. Alternatively or additionally, a menu for sharing as a chatroom dedicated to memo keeping may be provided as one of message share menus in the first chatroom Chatroom_A. In such a manner, the first message 401 may be set as a kept message by sharing (or saving) the first message 401 as a kept memo.

Referring to FIG. 5, the processor 220 may set the first message 401, from among the messages included in the first chatroom Chatroom_A, as a kept message and may display a Keep memo icon 501 indicating that the first message 401 is the kept message in an area adjacent to the first message 401, as shown in UI 400C.

In response to a selection on the Keep memo icon 501 of the first message 401, the processor 220 may cancel a kept message setting. In some embodiments, the Keep memo menu 411 may be changed with a menu for canceling the kept message setting and may be displayed on the context menu screen 410 that is provided in response to a selection on the first message 401 set as the kept message.

If at least one kept message is present in the first chatroom Chatroom_A, the processor 220 may display a keep icon 520 capable of accessing a kept message list of the first chatroom Chatroom_A in the first chatroom Chatroom_A, as shown in UI 400C. The keep icon 520 may be displayed in a form of a floating menu that is displayed on a screen at all times, following a movement by a user manipulation such as scrolling, in the first chatroom Chatroom_A.

FIGS. 6 to 14 illustrate examples of a kept message verification process, according to at least one example embodiment.

Figure 6:
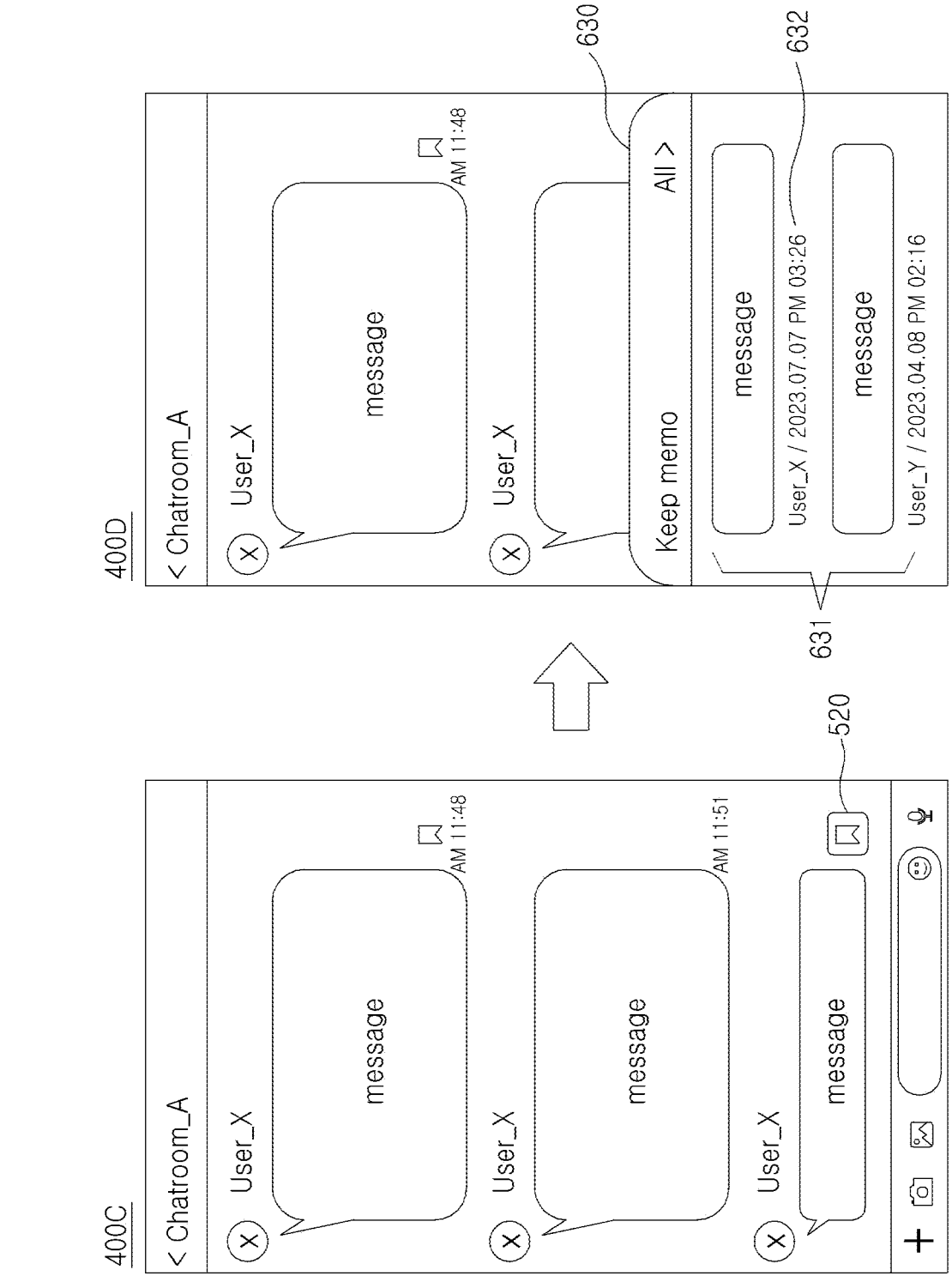
FIGS. 6 to 14 illustrate examples of a kept message verification process, according to at least one example embodiment.

Referring to FIG. 6, in response to a selection on the keep icon 520 in the first chatroom Chatroom_A of the UI 400C, the processor 220 may provide a kept message verification screen 630 in the first chatroom Chatroom_A, as shown in UI 400D.

If a single kept message (e.g., the first message 401) is set in the first chatroom Chatroom_A, the processor 220 may immediately move to focus the first message 401 and display the first message 401 without providing the kept message verification screen 630.

If two or more kept messages are set in the first chatroom Chatroom_A, the processor 220 may provide the kept message verification screen 630 as shown in UI 400D. As shown in FIG. 6, the kept message verification screen 630 may include a message list 631 of messages that are set as a kept message by being saved or shared as a kept memo in the first chatroom Chatroom_A.

The processor 220 may display original content and sender information of a message for each of the messages included in the message list 631. In an embodiment, the processor 220 may display time information 632 on a time at which the message has been set as a kept message, as message time information.

In response to a selection on the first message 401 from among the messages included in the message list 631 on the kept message verification screen 630, the processor 220 may move to focus and display the first message 401 within the first chatroom Chatroom_A.

Figure 7:
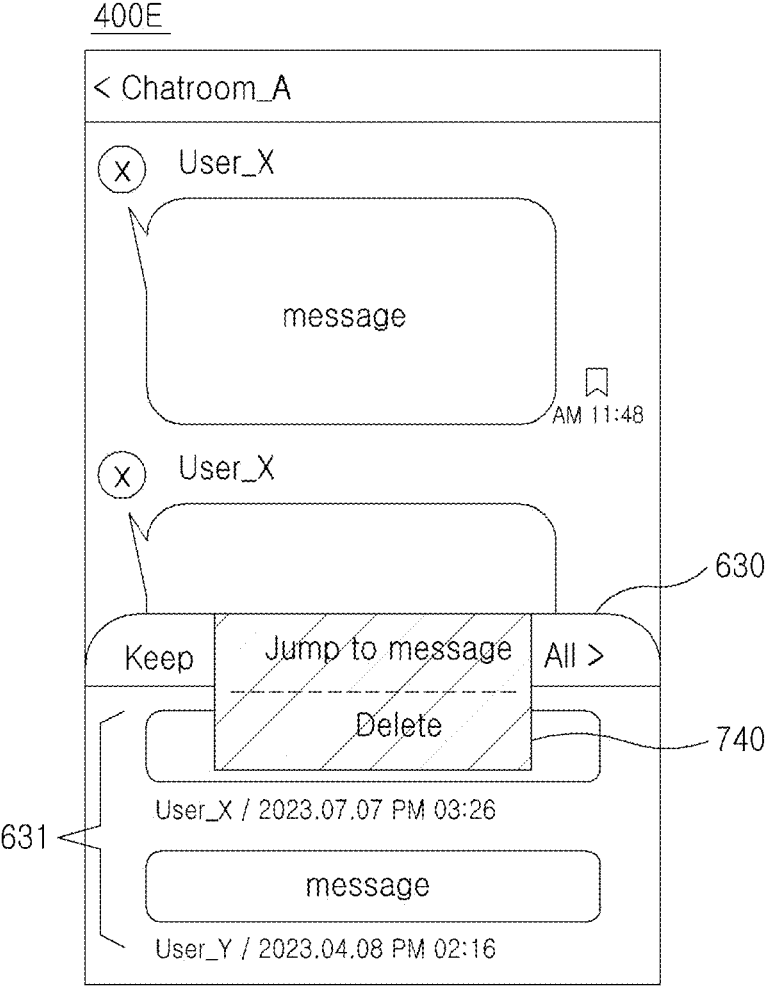

Referring to FIG. 7, in response to a selection on the first message 401 on the kept message verification screen 630, the processor 220 may initially provide a context menu screen 740 for the first message 401, as shown in UI 400E. The context menu screen 740 may include a menu option for moving to the original message within a chatroom and a menu option for deleting a corresponding message from the message list 631.

When a message is deleted from the message list 631 on the kept message verification screen 630, the processor 220 may cancel the kept message setting for the corresponding message. That is, through synchronization, the corresponding message may be deleted from all interfaces related to the message keeping function such as a chatroom dedicated to memo keeping. For example, the message for which the kept message setting is canceled may be excluded from being displayed by the Keep memo icon 501 within the original chatroom.

When a message set as a kept message through a kept memo in the original chatroom is deleted, the processor 220 may process message deletion according to chatroom specifications. The kept message deleted from the original chatroom may be displayed as the deleted message in all interfaces related to the message keeping function, such as the kept message verification screen 630 and the chatroom dedicated to memo keeping, according to specifications of the original chatroom.

Figure 8:
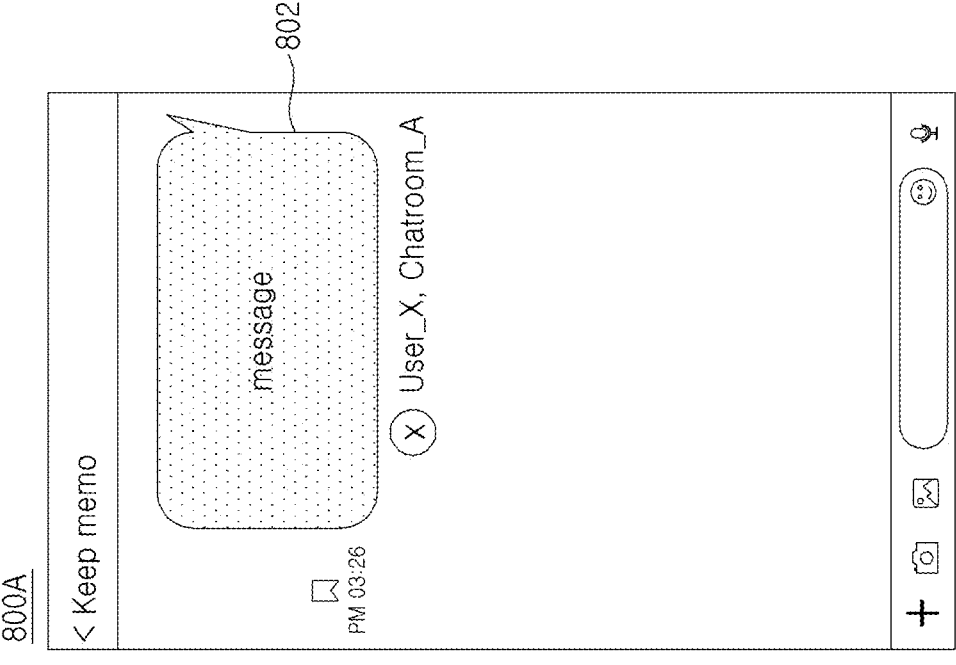

Referring to FIG. 8, in a case of saving or sharing the first message 401 in the first chatroom Chatroom_A as the kept memo, the processor 220 may generate a second message 802 that includes original content and a message ID of the first message 401 and a link to move to the first chatroom Chatroom_A corresponding to a source of the first message 401, as a message associated with the first message 401, and may send the second message 802 to a chatroom dedicated to memo keeping, as shown in UI 800A.

The chatroom dedicated to memo keeping of UI 800A may be included in a chatroom list in the messenger and may be entered through another interface related to the chatroom list and/or the message keeping function.

The processor 220 may display original message content and sender information of the first message 401 and a name of the first chatroom Chatroom_A, which is the source of the first message 401, for the second message 802 that is a kept message for the first message 401. The processor 220 may also display time information on a time at which the first message 401 is set as the kept message as message time information for the second message 802.

That is, time information displayed adjacent to the first message 401 in the first chatroom Chatroom_A corresponds to a message send time at which messages are exchanged through the first chatroom Chatroom_A, and time information displayed adjacent to the second message 802 in the chatroom dedicated to memo keeping may correspond to time information on a time at which the first message 401 is set as the kept message through a memo regardless of the message send time of the first message 401.

Figure 9:
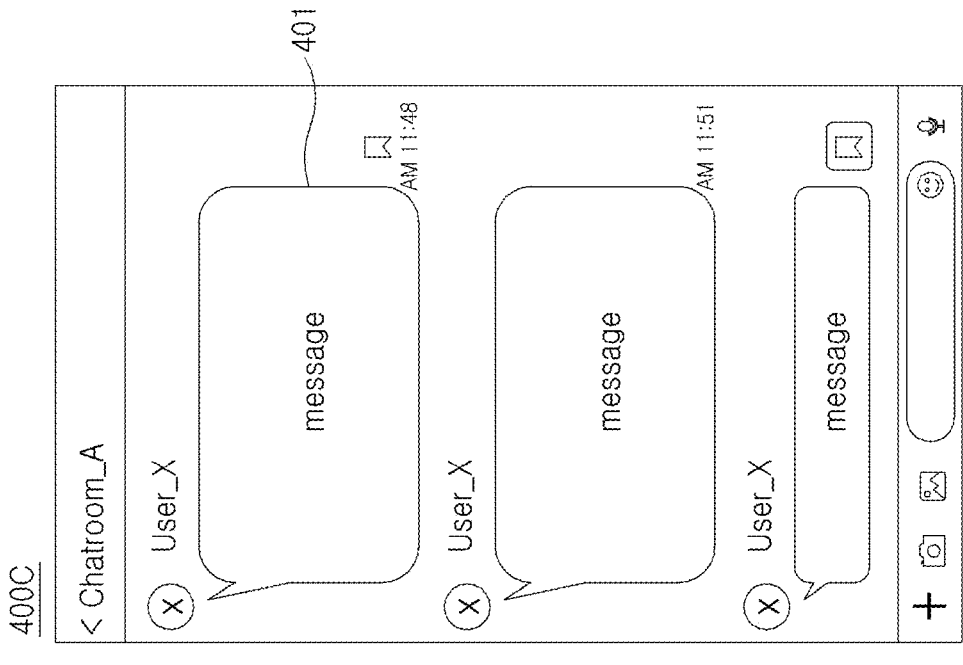

The second message 802 may include a link to move to the first chatroom Chatroom_A corresponding to the source of the first message 401. Referring to FIG. 9, in response to a selection on the second message 802 in the chatroom dedicated to memo keeping, the processor 220 may move to the first chatroom Chatroom_A and may move to focus and display the first message 401, as shown in UI 400C, for example.

Figure 10:
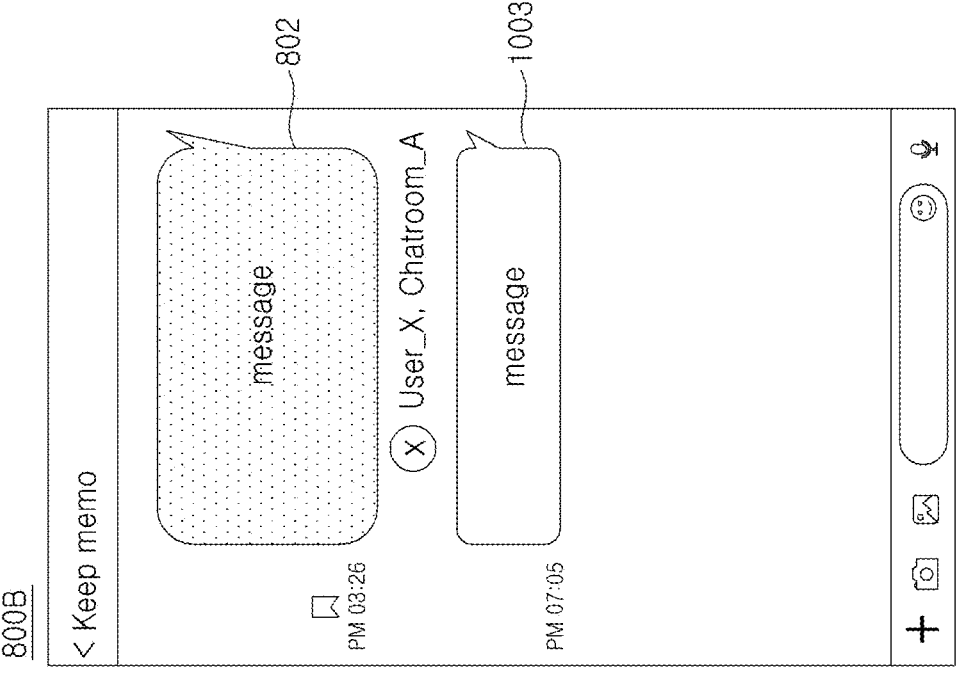

Referring to FIG. 10, the processor 220 may receive and display a third message 1003 that is input from the user through an in-chatroom input interface capable of inputting a variety of content, such as, but not limited to, photo, video, link, text, file, location, or the like, in the chatroom dedicated to memo keeping. That is, the user may directly input a third message 1003 to be kept in the chatroom dedicated to memo keeping, as shown in UI 800B. The processor 220 may display a kept message related to the original chatroom among messages included in the chatroom dedicated to memo keeping to be distinguished from other kept messages, as shown in UI 800B. In displaying the chatroom dedicated to memo keeping of UI 800B, the processor 220 may differently demonstrate display factors (e.g., shape or color of speech balloon) of the second message 802 that is the kept message for the first message 401 of the first chatroom Chatroom_A and the third message 1003 that is directly input through the input interface in the chatroom dedicated to memo keeping, or may distinguishably display the second message 802 and the third message 1003 using separate display factors (e.g., icon).

In response to a request for accessing the chatroom dedicated to memo keeping, the processor 220 may move to the chatroom dedicated to memo keeping 800 and may display the second message 802 and the third message 1003 on the chatroom dedicated to memo keeping as shown in UI 800B. For example, the chatroom dedicated to memo keeping may include a filtering function capable of distinguishing and displaying messages by message content type (e.g., photo, video, link, text, file, location, or the like) and/or a filtering function capable of distinguishing and displaying messages by original chatroom for kept messages related to original chatrooms. For example, the chatroom dedicated to memo keeping may provide filtering results in which only kept messages of a text type are selected and/or may provide filtering results in which kept messages related to messages of the first chatroom Chatroom_A are selected according to a user request.

Figure 11:
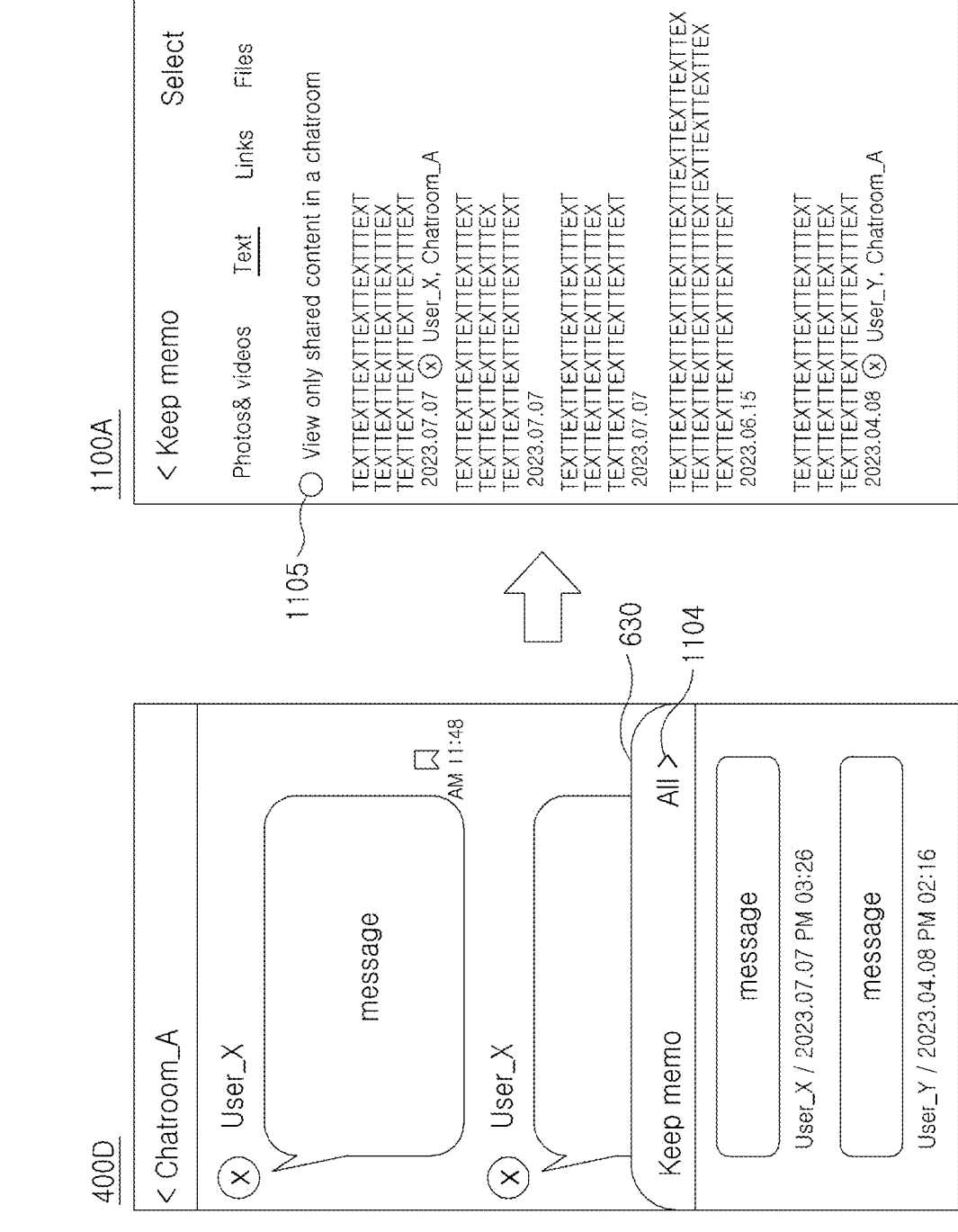

Referring to FIG. 11, the kept message verification screen 630 that provides the kept message list of the first chatroom Chatroom_A may include a menu 1104 for moving to a kept message management screen 1100 capable of verifying the entire kept messages, as shown in UI 400D. In some embodiments, the chatroom dedicated to memo keeping may include the menu 1104 for moving to the kept message management screen 1100A.

In response to a selection on the menu 1104 in the kept message verification screen 630 or the chatroom dedicated to memo keeping, the processor 220 may provide the kept message management screen 1100A.

The kept message management screen 1100A may be provided in a service page form in the messenger, which may differ from the chatroom dedicated to memo keeping that may be provided in a chatroom form.

The kept message management screen 1100A may include the entire kept messages. That is, the kept message management screen 1100A may include messages set as kept messages by being saved and/or shared as kept memos in a chatroom and/or messages input as kept messages through a separate input interface such as the chatroom dedicated to memo keeping and/or the kept message management screen 1100A.

The kept message management screen 1100A may include an overall tab for sorting and showing all kept messages by a specified order (e.g., in order of storage times) and a specific-type message tab for categorizing and thereby displaying messages by content type such as photo, video, link, text, file, location, or the like.

The kept message management screen 1100A may include a View chatroom kept message menu 1105 for classifying kept messages associated with the original chatroom, that is, messages set as kept messages through kept memos in the chatroom.

Figure 12:
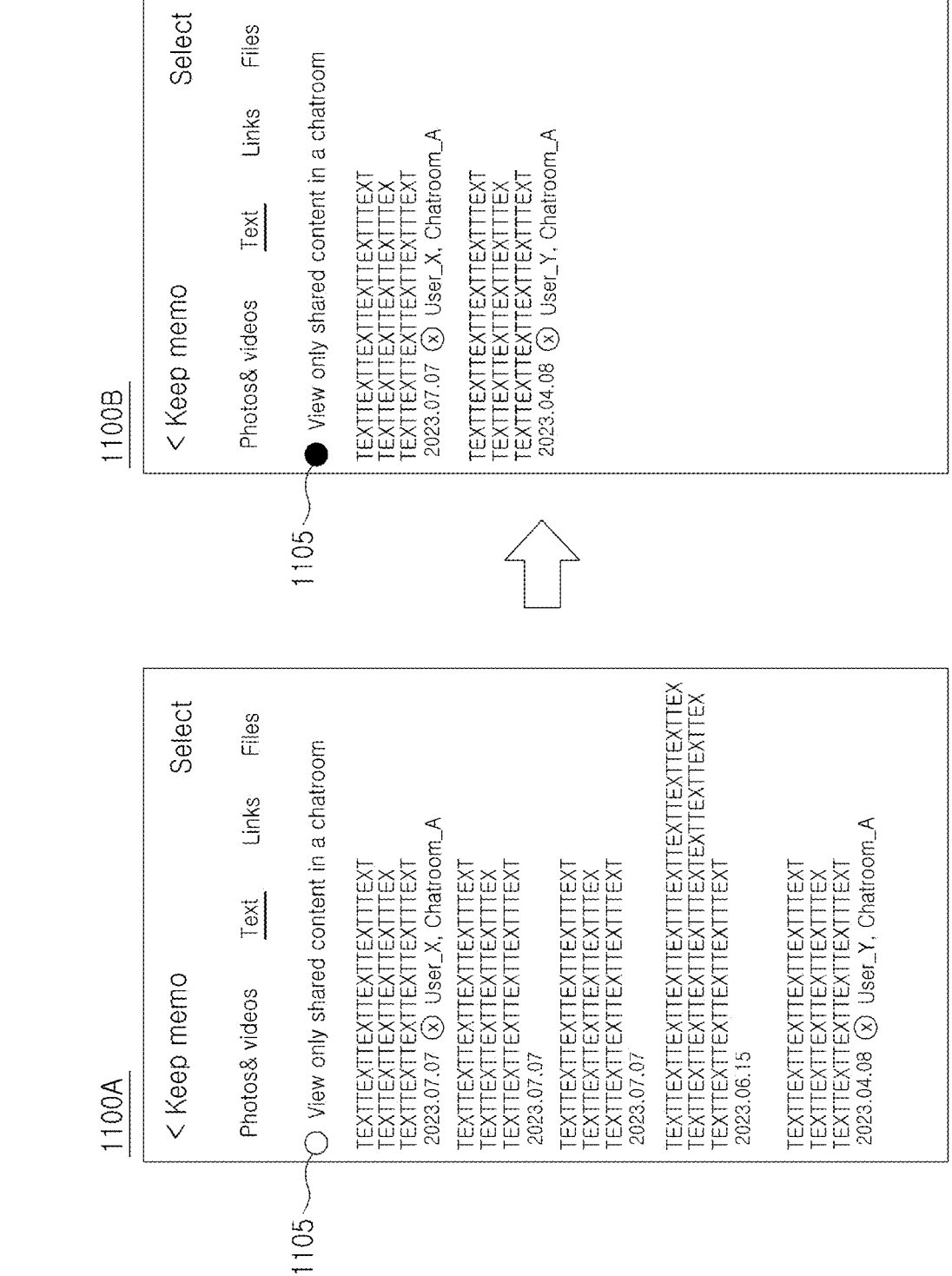

Referring to FIG. 12, in response to a selection on the View chatroom kept message" menu 1105 on the kept message management screen 1100A, the processor 220 may collect and display only messages set as kept messages by saving or sharing the messages as kept memos in the chatroom, excluding messages input as the kept messages through a separate input interface such as the chatroom dedicated to memo keeping or the kept message management screen 1100A, as shown in kept message management screen 1100B.

The processor 220 may display time information on a time at which each message is set as a kept message for each kept message on the kept message management screens 1100A and 1100B. For example, a message set as a kept message through a kept memo in the chatroom may be displayed with message content and sender name of the original message and a chatroom name.

Figure 13:
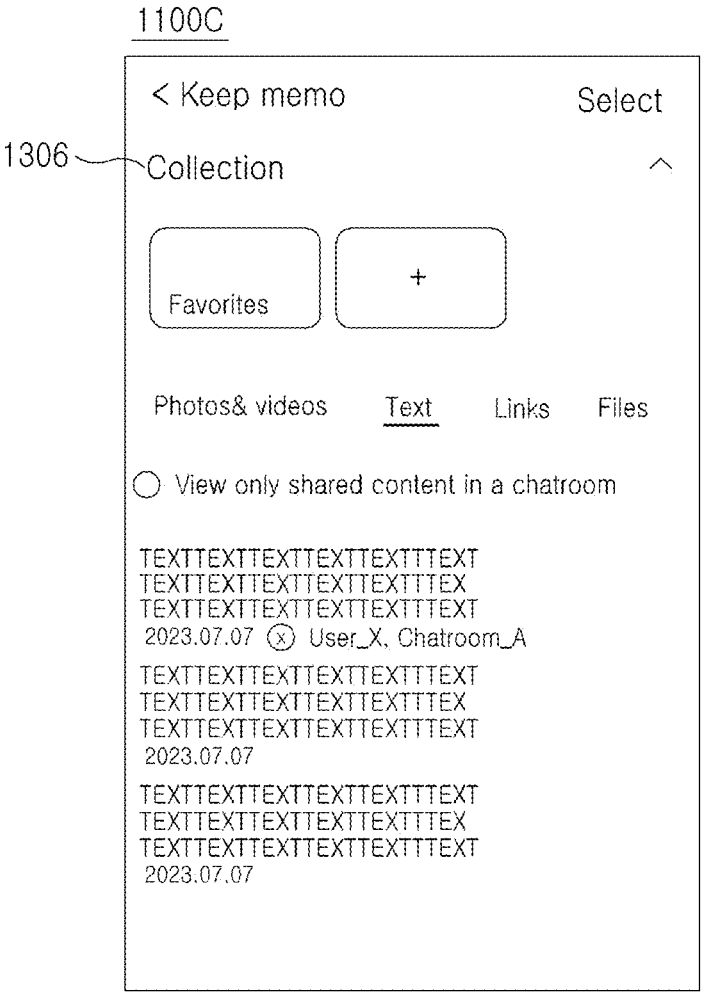

Referring to FIG. 13, depending on example embodiments, the kept message management screen 1100C may include a collection menu 1306 for classifying messages through user settings in addition to a content type. The collection menu 1306 may provide a function capable of classifying and managing messages through a collection designated by the user in the concept of a folder. The user may designate a collection of kept messages among predetermined collections such as favorites or collections directly generated by the user and may classify and manage messages based on the designated collection. When sending the second message 802 associated with the first message 401 of the first chatroom Chatroom_A to the chatroom dedicated to memo keeping 800, one of the collections may be recommended for the second message 802 based on metadata or content of the first message 401. As another example, when sending the second message 802 associated with the first message 401 of the first chatroom Chatroom_A to the chatroom dedicated to memo keeping, the second message 802 may be classified based on the metadata or the content of the first message 401 in association with one of the collections.

In sending the second message 802 associated with the first message 401 of the first chatroom Chatroom_A to the chatroom dedicated to memo keeping, the second message

Figure 14:
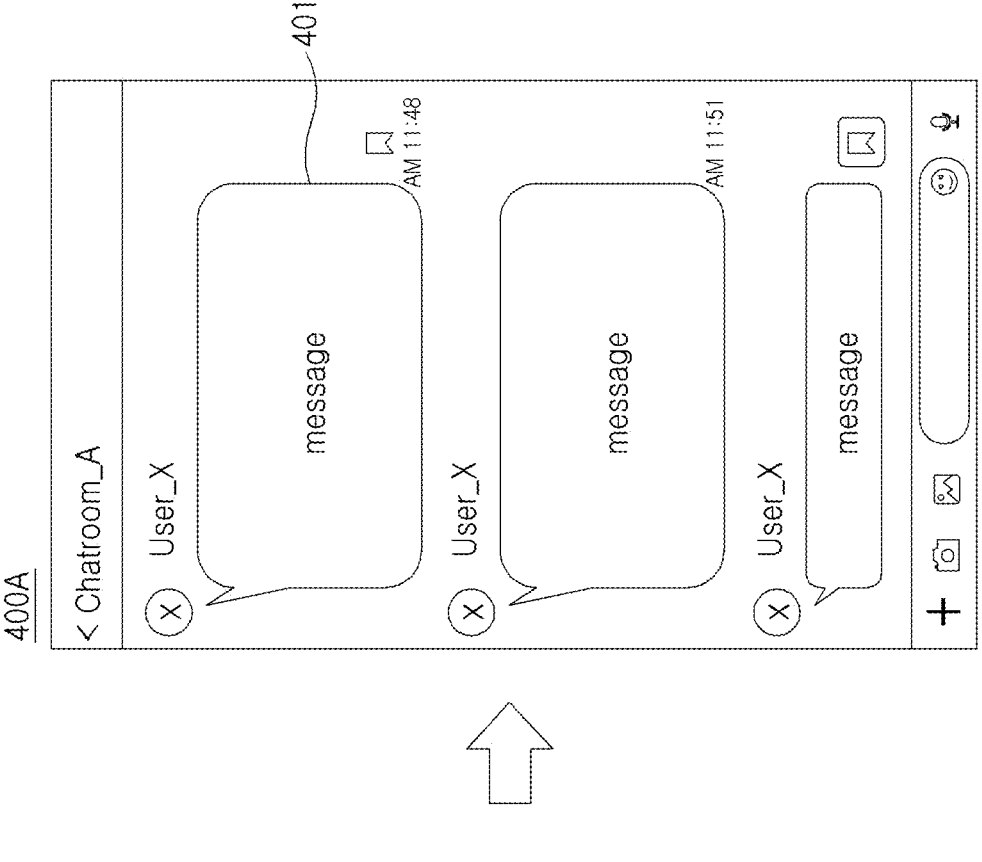

802 may be displayed on the kept message management screen 1100 through interconnection between the chatroom dedicated to memo keeping 800 and the kept message management screen 1100. The second message 802 includes a link to move to the first chatroom Chatroom_A corresponding to the source of the first message 401. Referring to FIG. 14, in response to a selection on the second message 802 on the kept message management screen 1100, the processor 220 may immediately move to the first chatroom Chatroom_A to focus and display the first message 401.

FIGS. 15 to 18 illustrate examples of a kept message reminding process, according to at least one example embodiment.

The example embodiment may set a reminder for a kept message and may send a reminder notification through the chatroom dedicated to memo keeping.

Figure 15:
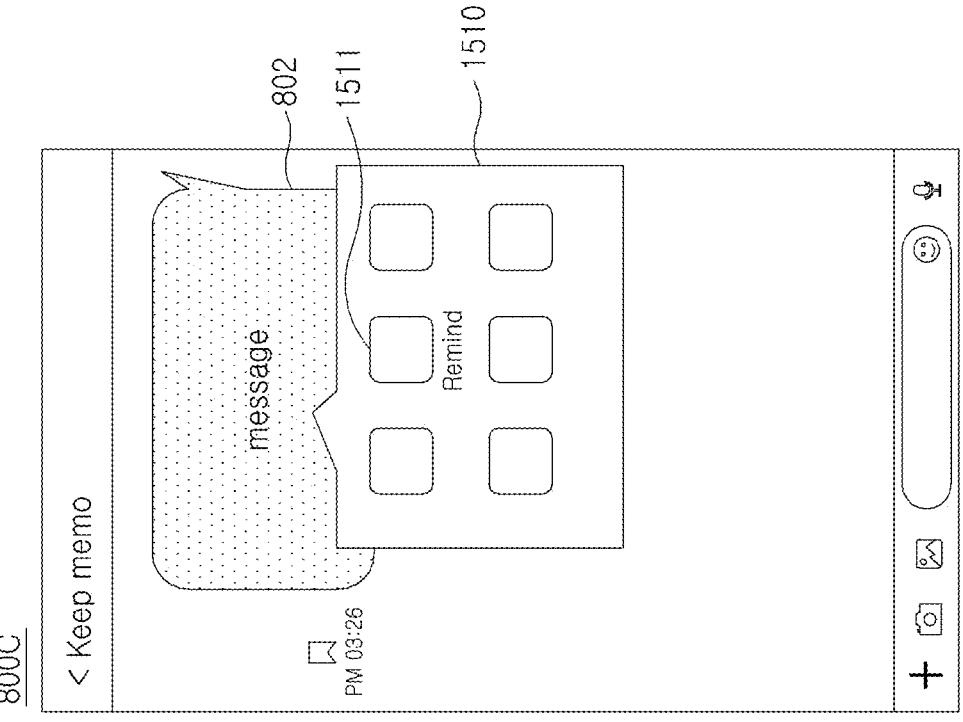

Referring to FIG. 15, in response to a selection in UI 800A on the second message 802 that is a kept message for the first message 401 in the chatroom dedicated to memo keeping, a context menu screen 1510 may be activated, as shown in UI 800C. For example, the context menu screen 1510 may include a Remind menu 1511 for setting the reminder.

Figure 16:
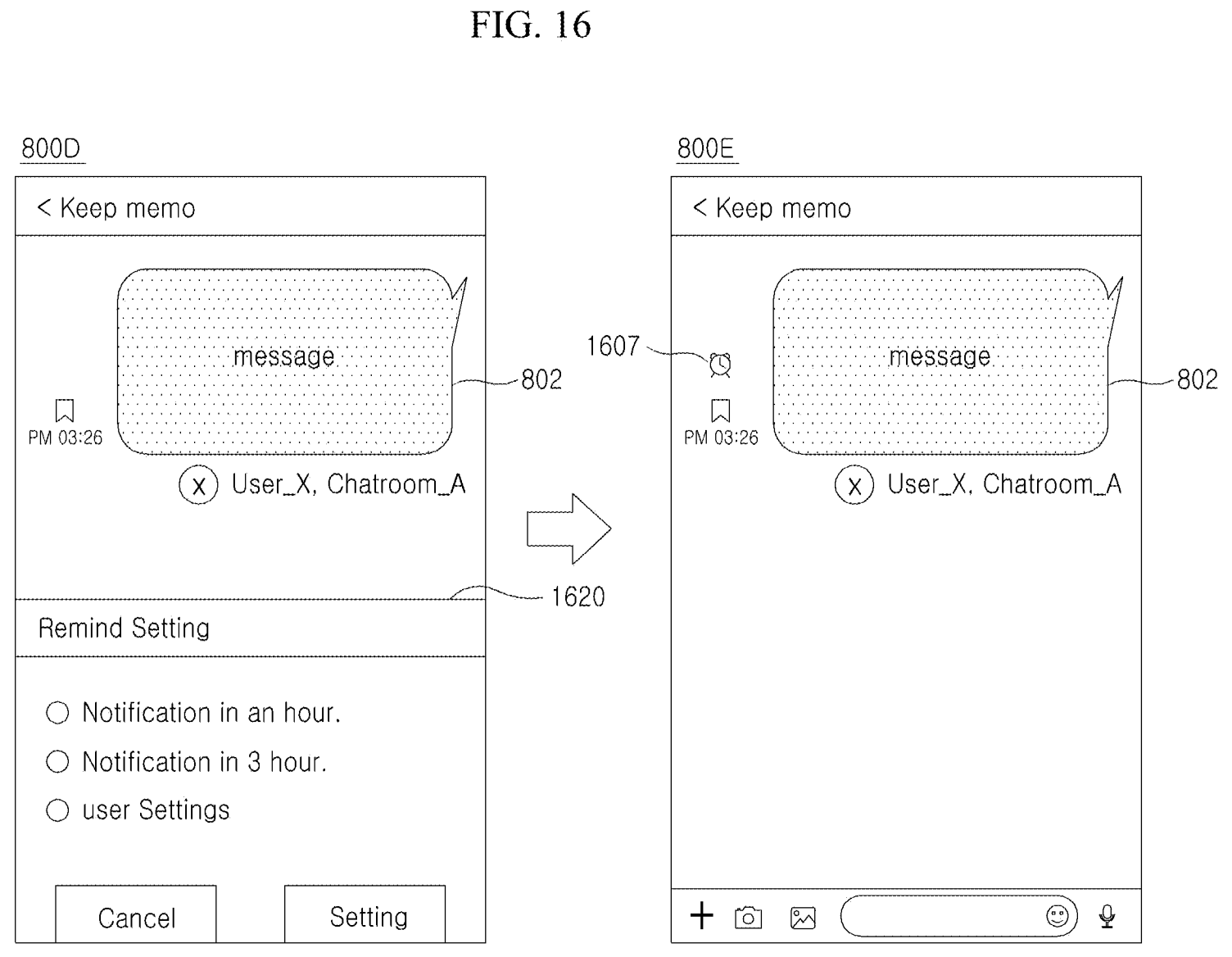

Referring to FIG. 16, in response to a selection on the Remind menu 1511 on the context menu screen 1510 in UI 800C, the processor 220 may provide a reminder setting screen 1620 in UI 800D. The reminder setting screen 1620 may include an interface for setting a reminder notification time. If the reminder notification time is set through the reminder setting screen 1620, the processor 220 may display a reminder icon 1607 indicating a reminder setting state in an area adjacent to the second message 802 to which a reminder is set, as shown in UI 800E. When the reminder for the second message 802 is set, the first chatroom Chatroom_A may display the reminder icon 1607 in an area adjacent to the first message 401.

Figure 17:
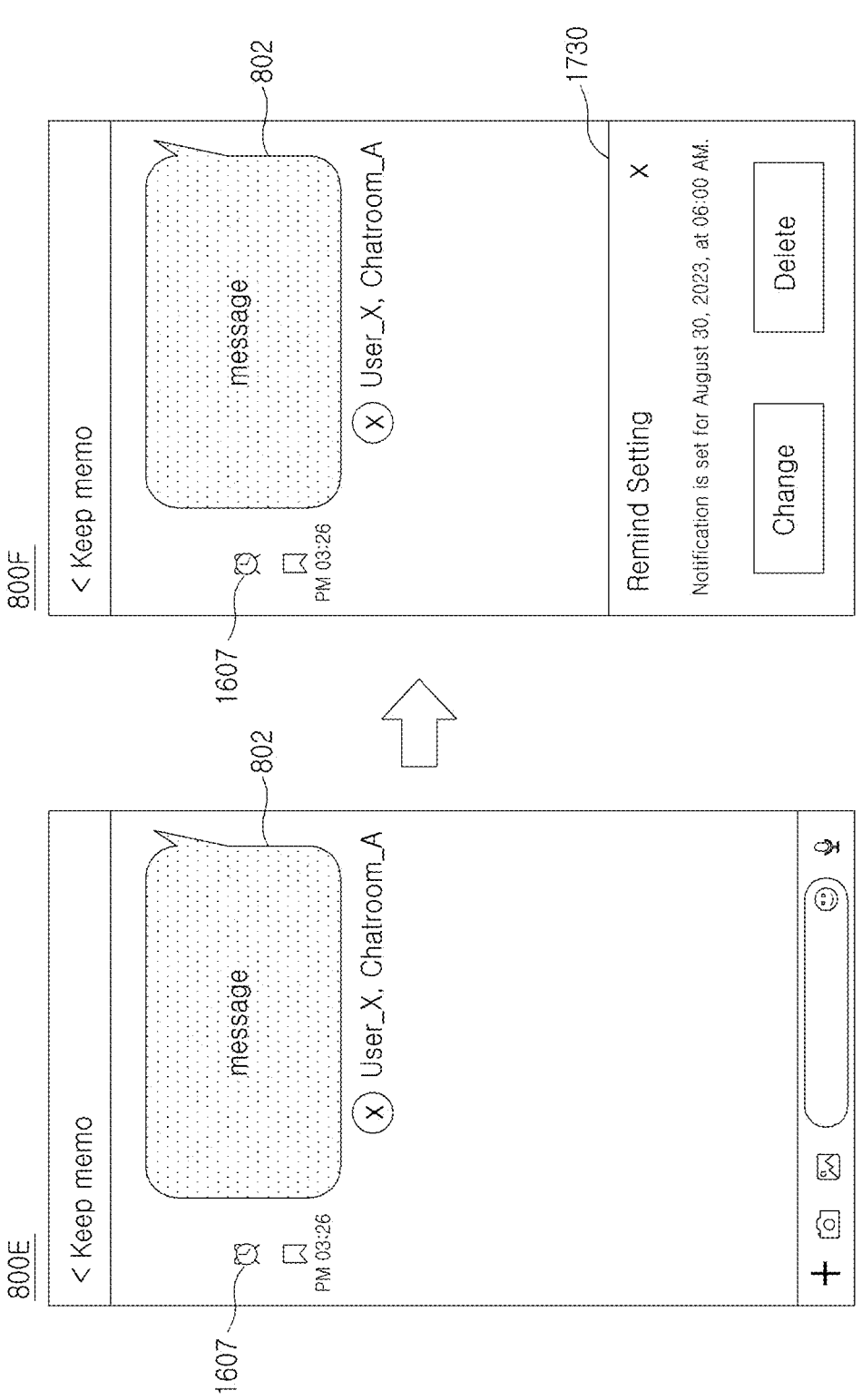

In response to a selection on the reminder icon 1607 of the second message 802, the reminder setting for the second message 802 may be canceled or the reminder notification time may be changed. Referring to FIG. 17, in response to a selection on UI 800E on the second message 802 to which the reminder is set or the reminder icon 1607 of the second message 802 to which the reminder is set, the reminder resetting screen 1730 may be provided, as shown in UI 800F. The reminder resetting screen 1730 may include a menu capable of changing the reminder notification time and a menu capable of canceling the reminder setting.

In example embodiments, the Remind menu 1511 may be changed to a menu capable of canceling the reminder setting and displayed on the context menu screen 1510 that is provided in response to the selection on the second message 802 to which the reminder is set.

Figure 18:
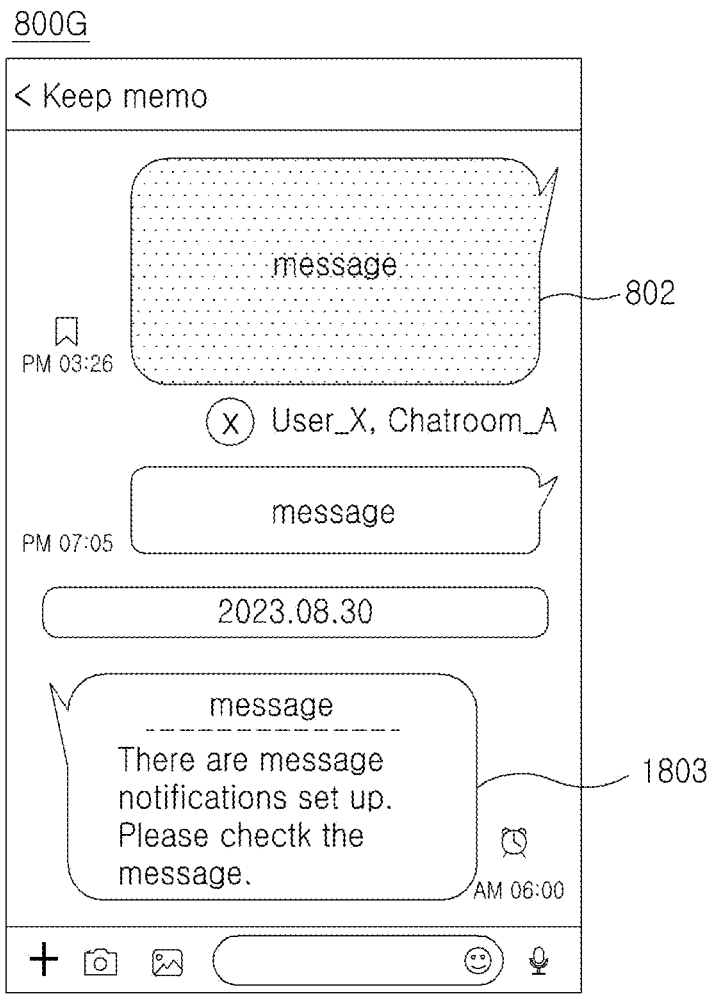

Referring to FIG. 18, in response to arrival of the reminder notification time set to the second message 802, the processor 220 may send a reminder notification message 1803 through the chatroom dedicated to memo keeping, as shown in UI 800G. The reminder notification message 1803 may be generated and sent as a reply message type to the second message 802, and may be displayed on the chatroom dedicated to memo keeping based on a sorting standard that may be distinct from the second message 802. For example, when the second message 802 is displayed as right-aligned, the reminder notification message 1803 may be displayed as left-aligned.

The reminder notification message 1803 for the second message 802 may include original message content and sender information of the first message 401, a chatroom name, and a link to move to the first chatroom Chatroom_A corresponding to the source of the first message 401. In response to a selection on the reminder notification message 1803 in the chatroom dedicated to memo keeping 800, the processor 220 may move to the first chatroom Chatroom_A and may move to focus and display the first message 401 within the first chatroom Chatroom_A.

Although a reminder for a message included in the chatroom dedicated to memo keeping 800 is described, it is provided as an example only. Without being limited thereto, the reminder may be set for messages in all chatrooms within the messenger, and/or the reminder notification may be provided through the chatroom dedicated to memo keeping.

In the example embodiment, when a user uses a messenger on a plurality of devices with the same identity (ID), the user may synchronize and manage in real time messages set as kept messages through kept memos on the messenger installed on each device through interconnection between the devices.

Aspects of example embodiments provide for a message to be saved by a user among messages exchanged in a chatroom in the corresponding chatroom, and to manage the messages in one user interface through a chatroom dedicated to memo keeping and to strengthen a link with the original chatroom by providing a link connectable to the original.

The apparatuses described above may be implemented using hardware components, software components, and/or combination of the hardware components and the software components. For example, the apparatuses and the components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For simplicity, the description of a processing device is used as singular. However, one skilled in the art may appreciate that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, a computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to some example embodiments may be configured in a form of program instructions performed through various computer methods and recorded in non-transitory computer-readable media. As used herein, the media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store program instructions, such as ROM, RAM, flash memory, and the like. Examples of other media may include recording media and storage media managed by an app store that distributes applications or a site, a server, and the like that supplies and distributes other various types of software.

The foregoing embodiments are merely examples and are not to be construed as limiting. The present teaching may be readily applied to other types of apparatuses. Also, the description of the exemplary embodiments is intended to be illustrative, and not to limit the scope of the claims, and many alternatives, modifications, and variations may be apparent to those skilled in the art.

What is claimed is:

1. A message keeping method performed by at least one processor of a device, the message keeping method comprising:

receiving a selection input of at least one first message from among a plurality of messages comprised in a first chatroom;

adding, based on the selection input, the at least one first message to a kept message list to be displayed in the first chatroom; and sending, to a second chatroom and based on the selection input, a second message associated with the at least one first message and comprising original content of the at least one first message and a link addressed to the first chatroom, the second chatroom being dedicated to message keeping.

2. The message keeping method of claim 1, further comprising:

displaying, in the first chatroom and based on the selection input, at least one icon indicating that each message of the at least one first message is a kept message.

3. The message keeping method of claim 1, further comprising:

displaying an access icon in the first chatroom; and displaying, based on a first selection on the access icon, the kept message list in the first chatroom.

4. The message keeping method of claim 3, further comprising:

focusing the at least one first message in the first chatroom based on a second selection on the at least one first message in the kept message list.

5. The message keeping method of claim 1, further comprising:

displaying the second chatroom comprising the second message based on a request for entry into the second chatroom.

6. The message keeping method of claim 5, wherein the displaying of the second chatroom comprises:

displaying time information, on a time at which the at least one first message is set as a kept message, based on the selection input, as message time information related to the second message.

7. The message keeping method of claim 5, wherein the displaying of the second chatroom comprises:

displaying, as information associated with the at least one first message for the second message, at least one of sender information of the at least one first message or a name of the first chatroom.

8. The message keeping method of claim 5, further comprising:

moving from the second chatroom to the first chatroom based on a selection on the second message in the second chatroom; and transitioning focus to the at least one first message in the first chatroom.

9. The message keeping method of claim 5, further comprising:

displaying, in the second chatroom, a third message input through an interface of the second chatroom, wherein the displaying of the third message comprises distinguishably displaying, in the second chatroom, the second message and the third message.

10. The message keeping method of claim 9, wherein the distinguishably displaying of the second message and the third message comprises:

distinguishing the second message from the third message by displaying information related to the at least one first message.

11. The message keeping method of claim 5, wherein the displaying of the second chatroom comprises:

distinguishably displaying messages comprised in the second chatroom by content type.

12. The message keeping method of claim 5, wherein the displaying of the second chatroom comprises:

filtering the second message among messages comprised in the second chatroom based on the first chatroom.

13. The message keeping method of claim 5, further comprising:

setting a reminder for the at least one first message based on at least one of a first selection on the at least one first message in the first chatroom or a second selection on the second message in the second chatroom.

14. The message keeping method of claim 13, further comprising:

displaying, based on the setting of the reminder for the at least one first message, a first reminder icon in the first chatroom indicating the setting of the reminder for the at least one first message and a second reminder icon in the second chatroom indicating the setting of the reminder for the second message.

15. The message keeping method of claim 13, further comprising:

providing a reminder notification for the at least one first message through the second chatroom.

16. The message keeping method of claim 15, further comprising:

moving, based on a third selection on the reminder notification, from the second chatroom to the first chatroom; and transitioning focus to the at least one first message in the first chatroom.

17. A non-transitory computer-readable storage medium storing instructions for message keeping that, when executed by at least one processor of a device, cause the device to perform the message keeping method of claim 1.

18. A device, comprising:

a memory storing computer-readable instructions; and at least one processor communicatively coupled to the memory, wherein the at least one processor is configured to execute the computer-readable instructions to:

receive a selection input of at least one first message from among a plurality of messages comprised in a first chatroom;

add, based on the selection input, the at least one first message to a kept message list to be displayed in the first chatroom; and send, to a second chatroom and based on the selection input, a second message associated with the at least one first message and comprising original content of the at least one first message and a link addressed to the first chatroom, the second chatroom being dedicated to message keeping.

19. The device of claim 18, wherein the at least one processor is further configured to execute the computer-readable instructions to:

display the second chatroom comprising the second message based on a request for entry into the second chatroom;

display, in the second chatroom, a third message input through an interface of the second chatroom; and distinguishably display, in the second chatroom, the second message and the third message.

20. The device of claim 18, wherein the at least one processor is further configured to execute the computer-readable instructions to:

set a reminder for the at least one first message based on at least one of a first selection on the at least one first message in the first chatroom or a second selection on the second message in the second chatroom; and provide a reminder notification for the at least one first message through the second chatroom.

\* \* \* \* \*